United States Patent
Castilho et al.

(10) Patent No.: US 10,812,507 B2
(45) Date of Patent: Oct. 20, 2020

(54) SYSTEM AND METHODS FOR EFFICIENT COMBINING OF MALWARE DETECTION RULES

(71) Applicant: KnowBe4, Inc., Clearwater, FL (US)

(72) Inventors: Marcio Castilho, Palm Harbor, FL (US); Alin Irimie, Clearwater, FL (US); Michael Hanley, Palm Harbor, FL (US); Daniel Cormier, Clearwater, FL (US); Raymond Skinner, Dunedin, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 16/389,132

(22) Filed: Apr. 19, 2019

(65) Prior Publication Data

US 2020/0195664 A1    Jun. 18, 2020

Related U.S. Application Data

(60) Provisional application No. 62/780,209, filed on Dec. 15, 2018.

(51) Int. Cl.
*H04L 29/06* (2006.01)

(52) U.S. Cl.
CPC .......... *H04L 63/1416* (2013.01); *H04L 63/20* (2013.01)

(58) Field of Classification Search
CPC .......................... H04L 63/1416; H04L 63/20
See application file for complete search history.

(56) References Cited

U.S. PATENT DOCUMENTS

| | | | |
|---|---|---|---|
| 7,599,992 B2 | 10/2009 | Nakajima | |
| 8,041,769 B2 | 10/2011 | Shraim et al. | |
| 8,464,346 B2 | 6/2013 | Barai et al. | |
| 8,484,741 B1 | 7/2013 | Chapman | |
| 8,615,807 B1 | 12/2013 | Higbee et al. | |
| 8,635,703 B1 | 1/2014 | Belani et al. | |
| 8,719,940 B1 | 5/2014 | Higbee et al. | |
| 8,793,799 B2 | 7/2014 | Fritzson et al. | |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,373,267 B2 | 6/2016 | Sadeh-Koniecpol et al. | |
| 9,398,029 B2 | 7/2016 | Sadeh-Koniecpol et al. | |

(Continued)

FOREIGN PATENT DOCUMENTS

| KR | 101816045 B1 | 1/2018 |
|---|---|---|
| WO | WO-2016/164844 A1 | 10/2016 |

OTHER PUBLICATIONS

Alvarez, Victor, YARA Documentation Release 3.8.1 (Year: 2018).*

(Continued)

*Primary Examiner* — Mahfuzur Rahman
*Assistant Examiner* — Richard W Cruz-Franqui
(74) *Attorney, Agent, or Firm* — Foley & Lardner LLP

(57) ABSTRACT

System and methods are described which are useful for efficiently combining characteristic detection rules, such as may be done to efficiently and quickly assist in the dispositioning of user reported security threats.

18 Claims, 11 Drawing Sheets

(56) References Cited

U.S. PATENT DOCUMENTS

| | | | |
|---|---|---|---|
| 9,398,038 B2 | 7/2016 | Higbee et al. | |
| 9,591,017 B1 | 3/2017 | Higbee et al. | |
| 9,635,052 B2 | 4/2017 | Hadnagy | |
| 9,667,645 B1 | 5/2017 | Belani et al. | |
| 9,674,221 B1 | 6/2017 | Higbee et al. | |
| 9,729,573 B2 | 8/2017 | Gatti | |
| 9,813,454 B2 | 11/2017 | Sadeh-Koniecpol et al. | |
| 9,870,715 B2 | 1/2018 | Sadeh-Koniecpol et al. | |
| 9,876,753 B1 | 1/2018 | Hawthorn | |
| 9,894,092 B2 | 2/2018 | Irimie et al. | |
| 9,906,541 B2 | 2/2018 | Park et al. | |
| 9,912,687 B1 | 3/2018 | Wescoe et al. | |
| 9,942,249 B2 | 4/2018 | Gatti | |
| 9,998,480 B1 | 6/2018 | Gates et al. | |
| 10,243,904 B1 | 3/2019 | Wescoe et al. | |
| 2006/0136390 A1* | 6/2006 | Zhao | G06F 16/9014 |
| 2007/0142030 A1 | 6/2007 | Sinha et al. | |
| 2008/0168560 A1* | 7/2008 | Durie | H04L 63/1425 726/23 |
| 2010/0211641 A1 | 8/2010 | Yih et al. | |
| 2010/0269175 A1 | 10/2010 | Stolfo et al. | |
| 2012/0079596 A1* | 3/2012 | Thomas | G06F 21/566 726/24 |
| 2012/0124671 A1 | 5/2012 | Fritzson et al. | |
| 2012/0226776 A1* | 9/2012 | Keebler | G06F 16/10 709/217 |
| 2012/0258437 A1 | 10/2012 | Sadeh-Koniecpol et al. | |
| 2012/0311658 A1* | 12/2012 | Dozier | G06F 21/604 726/1 |
| 2013/0145471 A1* | 6/2013 | Richard | G06F 21/562 726/24 |
| 2013/0198846 A1 | 8/2013 | Chapman | |
| 2013/0203023 A1 | 8/2013 | Sadeh-Koniecpol et al. | |
| 2013/0219495 A1 | 8/2013 | Kulaga et al. | |
| 2013/0297375 A1 | 11/2013 | Chapman | |
| 2014/0040730 A1* | 2/2014 | Prasad | G06F 40/103 715/249 |
| 2014/0143199 A1* | 5/2014 | Allen | G06N 5/025 706/47 |
| 2014/0173726 A1 | 6/2014 | Varenhorst | |
| 2014/0199663 A1 | 7/2014 | Sadeh-Koniecpol et al. | |
| 2014/0199664 A1 | 7/2014 | Sadeh-Koniecpol et al. | |
| 2014/0201835 A1 | 7/2014 | Emigh et al. | |
| 2014/0230061 A1 | 8/2014 | Higbee et al. | |
| 2014/0230065 A1 | 8/2014 | Belani et al. | |
| 2015/0098395 A1* | 4/2015 | Song | H04W 72/042 370/329 |
| 2015/0163242 A1 | 6/2015 | Laidlaw et al. | |
| 2015/0180896 A1 | 6/2015 | Higbee et al. | |
| 2015/0229664 A1 | 8/2015 | Hawthorn et al. | |
| 2015/0281260 A1* | 10/2015 | Arcamone | H04L 63/1408 726/11 |
| 2016/0036829 A1 | 2/2016 | Sadeh-Koniecpol et al. | |
| 2016/0080425 A1* | 3/2016 | Cianfrocca | H04L 63/0227 726/1 |
| 2016/0142439 A1 | 5/2016 | Goutal | |
| 2016/0164898 A1 | 6/2016 | Belani et al. | |
| 2016/0173510 A1 | 6/2016 | Harris et al. | |
| 2016/0197949 A1* | 7/2016 | Nyhuis | H04L 63/1416 713/190 |
| 2016/0234245 A1 | 8/2016 | Chapman | |
| 2016/0261618 A1 | 9/2016 | Koshelev | |
| 2016/0301705 A1* | 10/2016 | Higbee | H04L 63/1433 |
| 2016/0301716 A1 | 10/2016 | Sadeh-Koniecpol et al. | |
| 2016/0308897 A1 | 10/2016 | Chapman | |
| 2016/0330238 A1 | 11/2016 | Hadnagy | |
| 2016/0337250 A1* | 11/2016 | Ni | G06Q 10/06 |
| 2017/0026410 A1 | 1/2017 | Gatti | |
| 2017/0041454 A1* | 2/2017 | Nicholls | H04L 41/5009 |
| 2017/0078322 A1 | 3/2017 | Seiver et al. | |
| 2017/0104778 A1 | 4/2017 | Shabtai et al. | |
| 2017/0140663 A1 | 5/2017 | Sadeh-Koniecpol et al. | |
| 2017/0237776 A1 | 8/2017 | Higbee et al. | |
| 2017/0244746 A1 | 8/2017 | Hawthorn et al. | |
| 2017/0251009 A1 | 8/2017 | Irimie et al. | |
| 2017/0251010 A1 | 8/2017 | Irimie et al. | |
| 2017/0318046 A1 | 11/2017 | Weidman | |
| 2017/0331848 A1 | 11/2017 | Alsaleh et al. | |
| 2018/0041537 A1 | 2/2018 | Bloxham et al. | |
| 2018/0091306 A1* | 3/2018 | Antonopoulos | G06F 21/6218 |
| 2018/0103052 A1 | 4/2018 | Choudhury et al. | |
| 2018/0191754 A1* | 7/2018 | Higbee | G06F 21/00 |
| 2019/0121977 A1* | 4/2019 | Gordeychik | G06F 21/552 |
| 2019/0158275 A1* | 5/2019 | Beck | G06Q 20/3829 |
| 2019/0173819 A1 | 6/2019 | Wescoe et al. | |
| 2019/0215335 A1 | 7/2019 | Benishti | |
| 2019/0245885 A1 | 8/2019 | Starink et al. | |
| 2019/0245894 A1 | 8/2019 | Epple et al. | |
| 2019/0318653 A1 | 10/2019 | Shi | |
| 2019/0394291 A1* | 12/2019 | Kondamuri | H04L 69/324 |

OTHER PUBLICATIONS

Alvarez, Victor, YARA Documentation Release 3.8.1, Aug. 14, 2018 (Alvarez) (Year: 2018).*

NPL Search (Google Scholar) (Year: 2020).*

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.

Palka et al., "Dynamic pnisning content using generative grammars," Software Testing, Verification and Validation Workshops (ICSTW), 2015 IEEE Eighth International Conference, Date of Conference:Apr. 13-17, 2015,IEEE Xplore, pp. 1-8.

International Search Report and Written Opinion for PCT/US2019/065398 dated Feb. 19, 2020.

* cited by examiner

```
┌─────────────────────────────────────┐
│ Identifying a combination rule      │
│ comprising a plurality of           │
│ characteristic detection rules, to  │
│ be applied against an electronic    │
│ communication to detect             │
│ characteristics                     │
│ 310                                 │
└─────────────────────────────────────┘
                  │
                  ▼
┌─────────────────────────────────────┐
│ Generating an identifier for each   │
│ characteristic detection rule       │
│ 320                                 │
└─────────────────────────────────────┘
                  │
                  ▼
┌─────────────────────────────────────┐
│ Compiling a plurality of            │
│ characteristic detection rules and  │
│ their identifiers into a compiled   │
│ rule set                            │
│ 330                                 │
└─────────────────────────────────────┘
                  │
                  ▼
┌─────────────────────────────────────┐
│ Executing the compiled rule set     │
│ against the electronic              │
│ communication to detect whether the │
│ electronic communication comprises  │
│ a characteristic corresponding to   │
│ the compiled rule set               │
│ 340                                 │
└─────────────────────────────────────┘
                  │
                  ▼
┌─────────────────────────────────────┐
│ Receiving the identifier for each   │
│ characteristic detection rule that  │
│ matched against the electronic      │
│ communication                       │
│ 350                                 │
└─────────────────────────────────────┘
                  │
                  ▼
┌─────────────────────────────────────┐
│ Determining whether the combination │
│ rule matches the electronic         │
│ communication by applying logical   │
│ operators of the combination rule   │
│ based on the result of each         │
│ characteristic detection rule       │
│ 360                                 │
└─────────────────────────────────────┘
```

Characteristic Detection Rule

```
{
    "yara_operation": {
        "target": "BODY",
        // Characteristic Detection Rule Tag:
PHISHER_f5b5b90b52fd4d53ba8236454639f7c5_0
        "rule": "rule eicar\n{\n\tmeta:\n\t\
tdescription = \"Rule to detect Eicar pattern\"\n\n\
tstrings:\n\t\t$s1 = \"X5O!P%@AP[4\\\\
PZX54(P^)7CC)7}$EICAR-STANDARD-ANTIVIRUS-TEST-
FILE!$H+H*\" fullword ascii\n\n\tcondition:\n\t\tall
of them\n}"
    },
}
```

Fig. 4A

"revision_id": "string_to_indicate_revision_of_characteristic_detection_rule"

"rule": "rule eicar\n{\n\tmeta:\n\t\tdescription = \"Rule to detect Eicar pattern\"\n\n\tstrings:\n\t\t$s1 = \"X5O!P%@AP[4\\\\PZX54(P^)7CC)7}$EICAR-STANDARD-ANTIVIRUS-TEST-FILE!$H+H*\"\ fullword ascii\n\n\tcondition:\n\t\tall of them\n}"

Condition of Characteristic Detection Rule 430

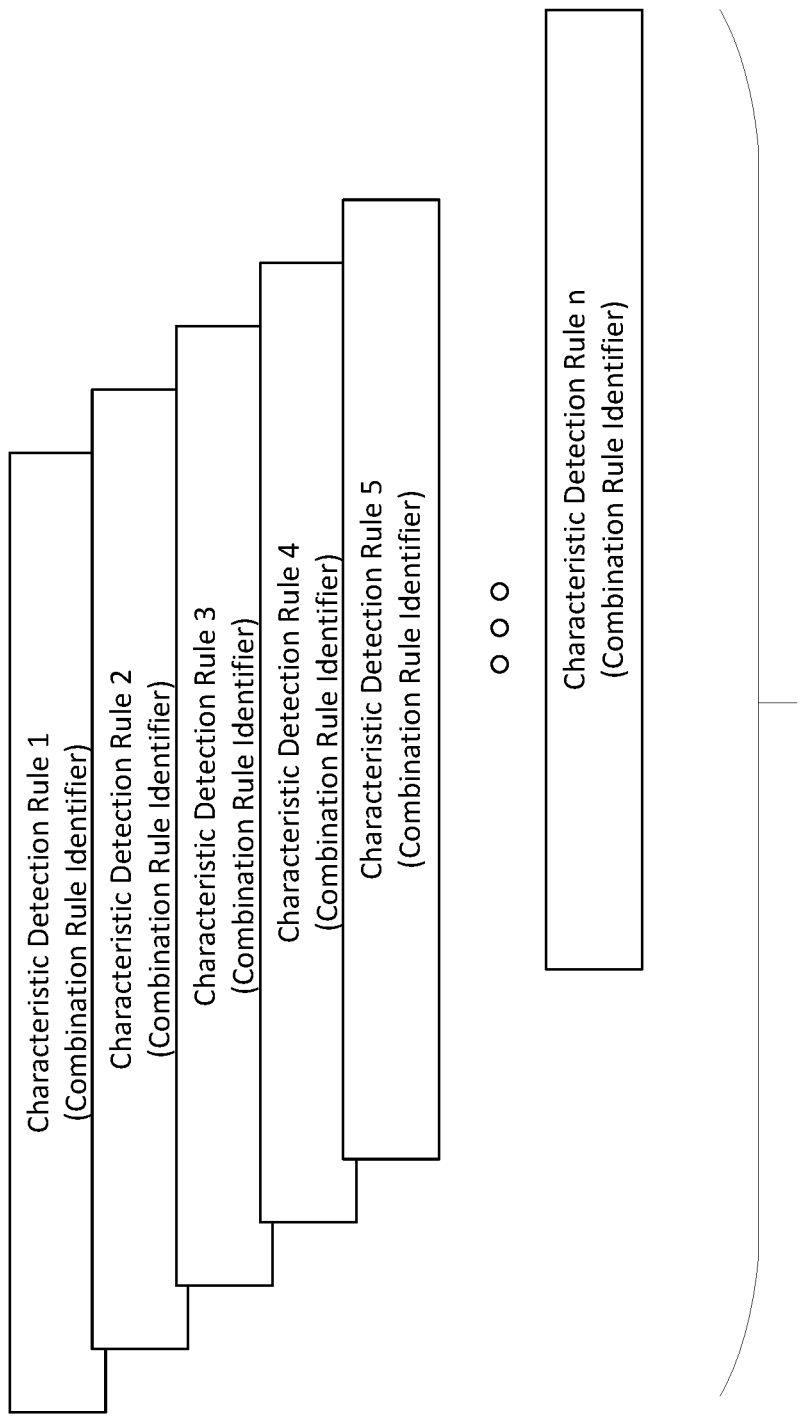

SYSTEM AND METHODS FOR EFFICIENT COMBINING OF MALWARE DETECTION RULES

CROSS-REFERENCE TO RELATED APPLICATION

This application claims priority to U.S. Provisional Application No. 62/780,209, filed Dec. 15, 2018, titled "SYSTEM AND METHODS FOR EFFICIENT COMBINING OF MALWARE DETECTION RULES," incorporated by reference herein in its entirety.

FIELD OF DISCLOSURE

This disclosure generally relates to systems and methods that are useful for efficiently combining characteristic detection rules, such as may be done to efficiently and quickly assist in the dispositioning of user reported security threats.

BACKGROUND OF THE DISCLOSURE

Cybersecurity incidents cost companies millions of dollars each year in actual costs and can cause customers to lose trust in an organization. Antivirus and anti-ransomware and other quarantine platforms can detect and intercept known attacks, however social engineering attacks or new (zero day) threats are not readily detectable by such tools, and organizations rely on their users to recognize such threats. The incidents of cybersecurity attacks and the costs of mitigating the damage is increasing every year. Many organizations implement computer-based security awareness training to educate users to be able to accurately identify threats.

When an employee identifies a message that they believe to be a threat, organizations want to know. Organizations typically therefore implement some method for the employee to report a suspicious message such that IT administrators at the organization can inspect the message and determine whether it is an actual threat. If the message is determined to be an actual threat, then the organization may perform various actions such as quarantining the message, updating their threat detection definitions, and/or to training their users.

As users in the organization become more informed about cybersecurity threats, more and more users will report more and more messages that they feel may be malicious. IT administrators in the organization can be overwhelmed with the sheer volume of reported threats, even while expedient classification of these threats is paramount. YARA is a tool aimed at (but not limited to) helping security researchers identify and classify malware samples. YARA rules allow the creation of descriptions of malware families based on pattern matching of textual or binary patterns. To identify characteristics and risks associated with each reported message, multiple YARA rules may be used to search various parts of the message and its attachments. These YARA rules may be specific to each company. To know if a message is a threat, it is necessary to know the outcome of each YARA rule in a set of YARA rules to be run against the message. Searches that require rules to be run one at a time will significantly slow the processing time required to determine if a message is potentially a threat. This also requires multiple database calls which would slow the processing time. If the textual or binary pattern of the YARA rule is found in the message, then the properties of the YARA rule (e.g., the name, metadata, or tags of the YARA rule) are returned in response to the call.

Therefore, system and methods which enable efficient dispositioning of incoming reported messages to determine the highest priority messages for deeper examination is needed.

BRIEF SUMMARY OF THE DISCLOSURE

A rule set comprises one or more characteristic detection rules. A rule set can be compiled and executed against electronic communications that users have reported to be a threat. A combination rule comprises multiple characteristic detection rules combined via one or more logical operators forming an expression with a binary or "yes/no" result. An example of a characteristic detection rule is a YARA rule. An electronic communication may be an email.

Each of the characteristic detection rules include a description of a characteristic based on either a textual or a binary pattern. In some embodiments, for each characteristic detection rule, a tag is generated which has predetermined tag identifier, a combination rule identifier, and an index, and the tags are attached to characteristic detection rules of a rule set before the rule set is compiled.

The compiled rule set is executed against an electronic communication to detect whether the communication has any of the characteristics that the characteristic detection rules in the rule set test for. The execution of the compiled rule set returns the tags, the name, and the metadata for each of the characteristic detection rules in the rule set that matched against the electronic communication (such as for which the binary or textual pattern specified by the characteristic detection rule was found in the electronic communication).

Based on the identification (using the tags, the name or the metadata for the characteristic detection rule, or any combination of tags, name and metadata for the characteristic detection rule) of the returned characteristic detection rules, the logical expression of each combination rule is constructed and evaluated. The result of the evaluated combination rule against the electronic communication allows the classification of the electronic communication based on its characteristics. For example, the result may indicate that the electronic communication is potentially a threat, or the result may indicate that the electronic communication is genuine, or the result may assist with some other desired disposition. In some examples, an index in the tag of the characteristic detection rule indicates its position in the logical expression of the combination rule that is identified by the rule identifier in the characteristic detection rule. In some examples, the tag comprises metadata associated with the characteristic detection rule which is used for its identification. In some examples, the name associated with the characteristic detection rule is used for its identification.

In some examples, a characteristic detection rule detects characteristics in a predetermined portion of the electronic communication, and different characteristic detection rules may target different parts of the electronic communication. Characteristic detection rules can be grouped and/or compiled into rule sets that are targeted to a specific part of the electronic communication only, instead of the entire electronic communication, and these compiled rule sets may only be executed against the parts of the electronic communication that they apply to.

In some embodiments, one rule set is compiled per organization. In some examples, one rule set for each part of an electronic communication is compiled per organization.

In some embodiments, for each characteristic detection rule, the name of the rule, the tag identifier of the rule, or the metadata associated with the rule may comprise the characteristic detection rule identifier, the combination rule identifier, and the index.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 depicts an implementation of a method for efficient combining characteristic detection rules;

FIG. 4A depicts an illustration of a characteristic detection rule, according to some embodiments;

FIG. 4C depicts an illustration of a characteristic detection rule, according to some embodiments; and FIG. 5 depicts an illustration of a rule set, according to some embodiments.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that are useful for efficiently combining characteristic detection rules.

A. Computing and Network Environment

Figure 1A:
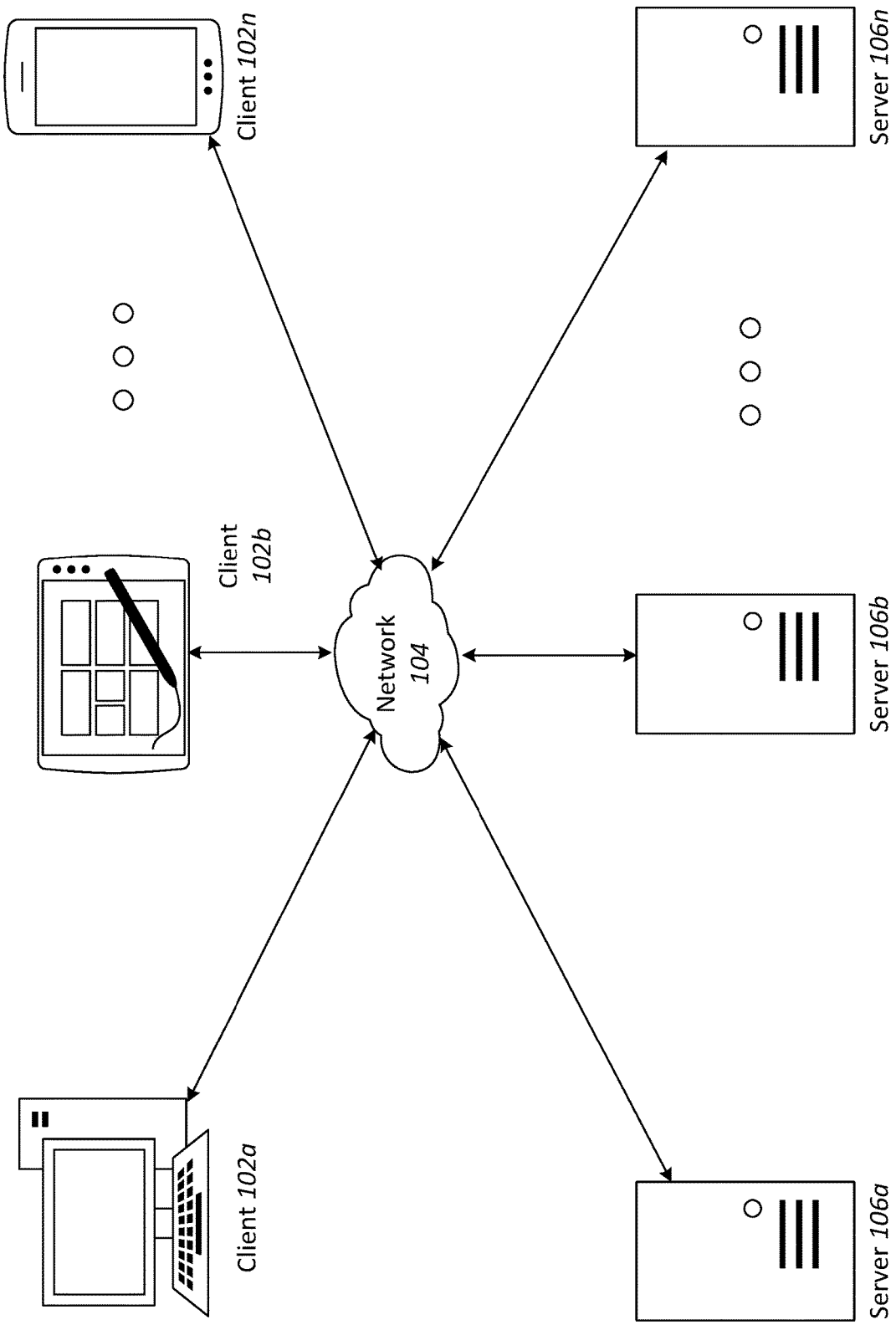
FIG. 1A is a block diagram depicting an embodiment of a network environment comprising client device in communication with server device, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (Wi-MAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
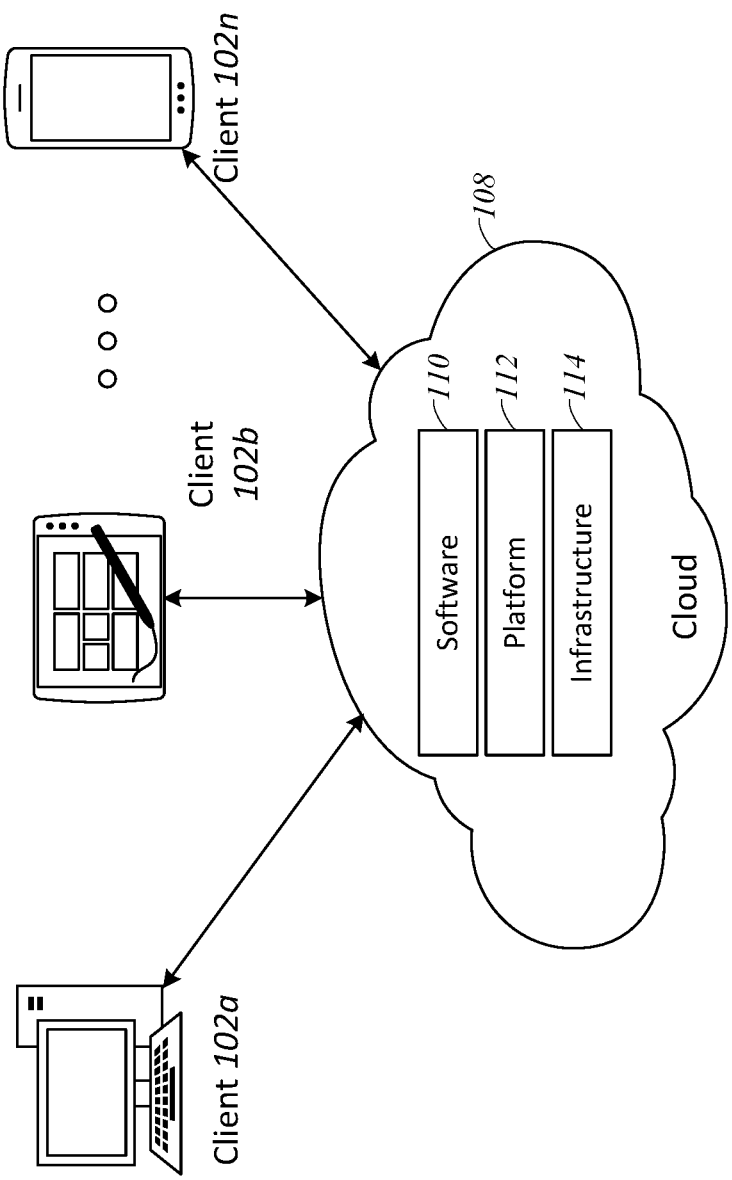
FIG. 1B is a block diagram depicting a cloud computing environment comprising client device in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
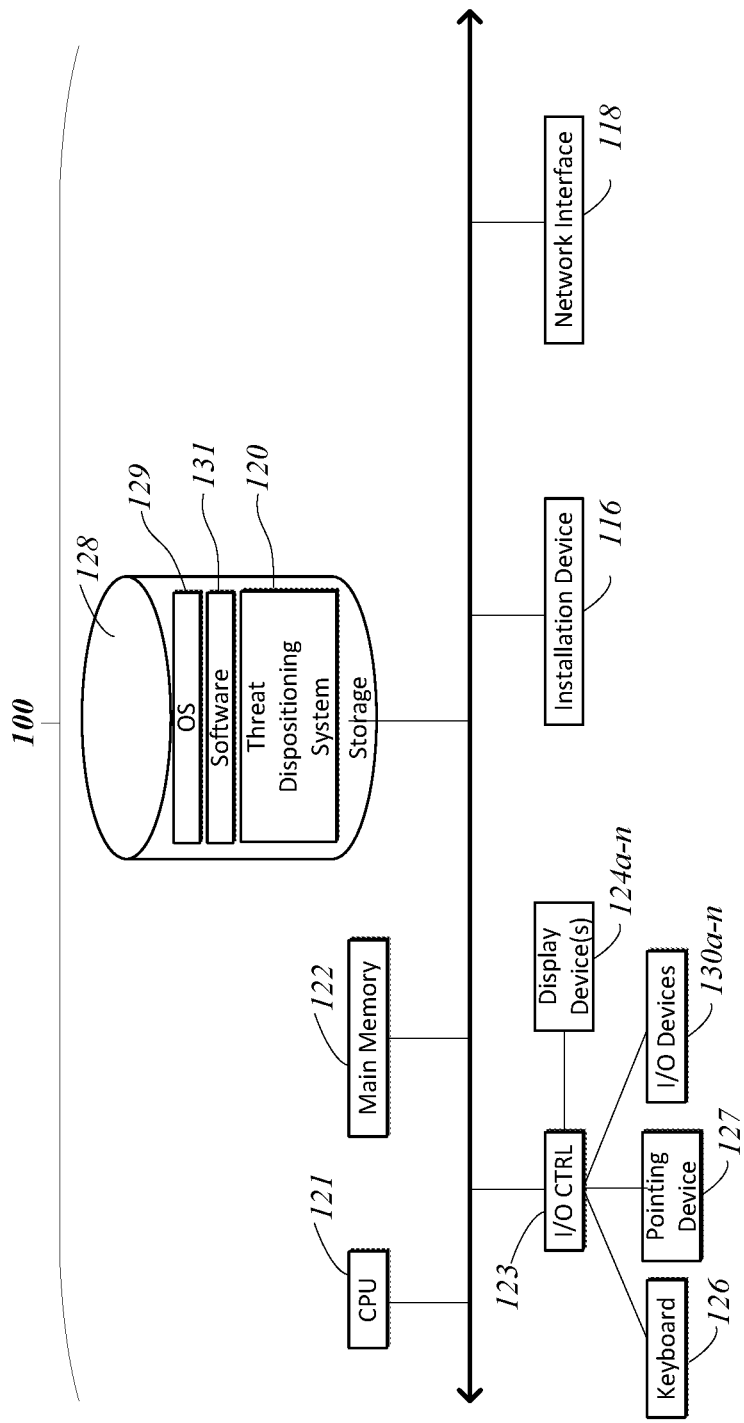
FIGS. 1C and 1D are block diagrams depicting embodiments of computing devices useful in connection with the methods and systems described herein.
Figure 1D:
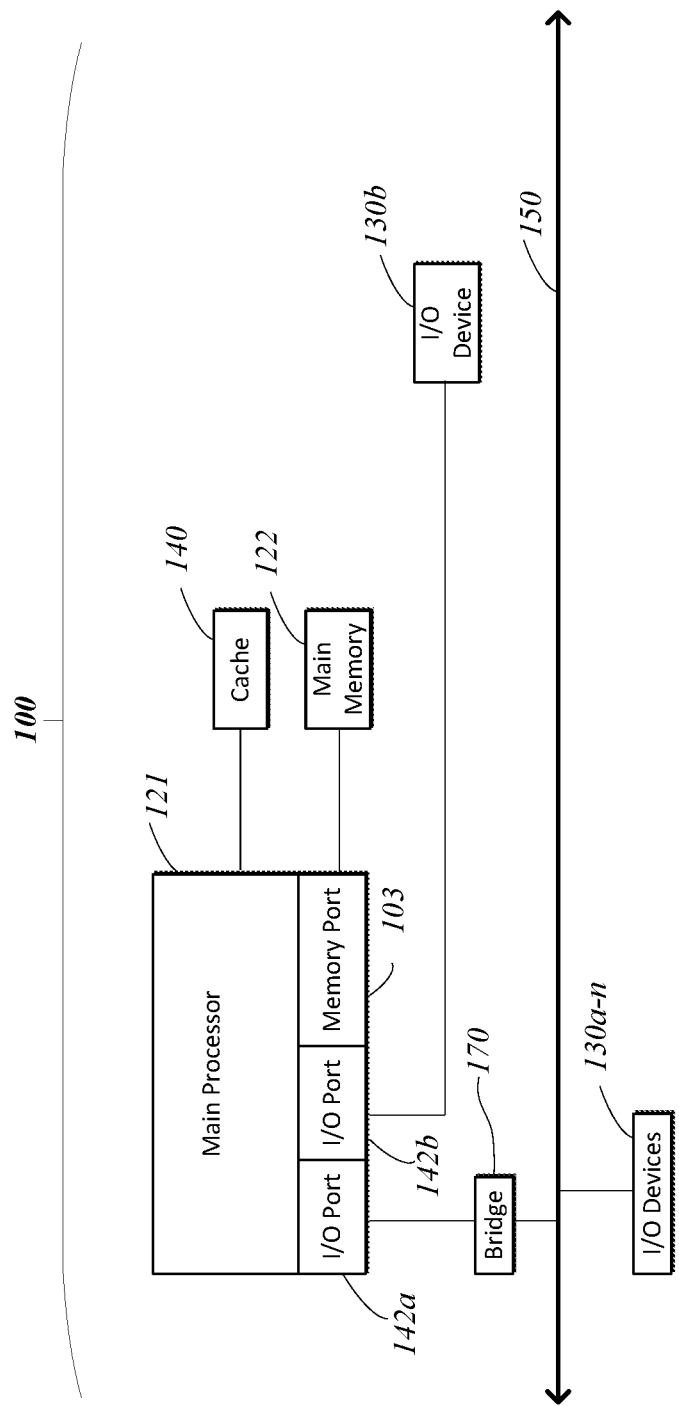

FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a threat dispositioning system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130*b* or other processors 121' via HYPER-TRANSPORT, RAPIDIO, or INFINIBAND communications technology. FIG. 1D also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple iPhone. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provide for voice recognition and inputs, including, e.g., Microsoft KINECT, SIRI for iPhone by Apple, Google Now or Google Voice Search, and Alexa by Amazon.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments, software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the threat dispositioning system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Efficient Threat Dispositioning Systems and Methods

The following describes systems and methods that are useful for efficiently combining characteristic detection rules, such as may be done to efficiently and quickly assist in the dispositioning of user reported security threats.

Cybersecurity incidents cost companies millions of dollars each year in actual costs and can cause customers to lose trust in an organization. Antivirus and anti-ransomware and other quarantine platforms can detect, and intercept known attacks, however social engineering attacks or new (zero day) threats are not readily detectable by such tools, and organizations rely on their users to recognize such threats. The incidents of cybersecurity attacks and the costs of mitigating the damage is increasing every year. Many organizations implement computer-based security awareness training to educate users to be able to accurately identify threats.

When an employee identifies a message that they believe to be a threat, organizations want to know. Organizations typically therefore implement some method for employees to report suspicious messages such that IT administrators at the organization can inspect the reported message and determine whether it is an actual threat. If the reported message is determined to be an actual threat, then the organization may perform various actions such as updating their threat detection definitions, and/or to train their users.

As users in the organization become more informed about cybersecurity threats, more and more users will report more and more messages that they feel may be malicious. IT administrators in the organization can be overwhelmed with the sheer volume of reported threats, even while expedient classification of these threats is paramount.

Figure 2A:
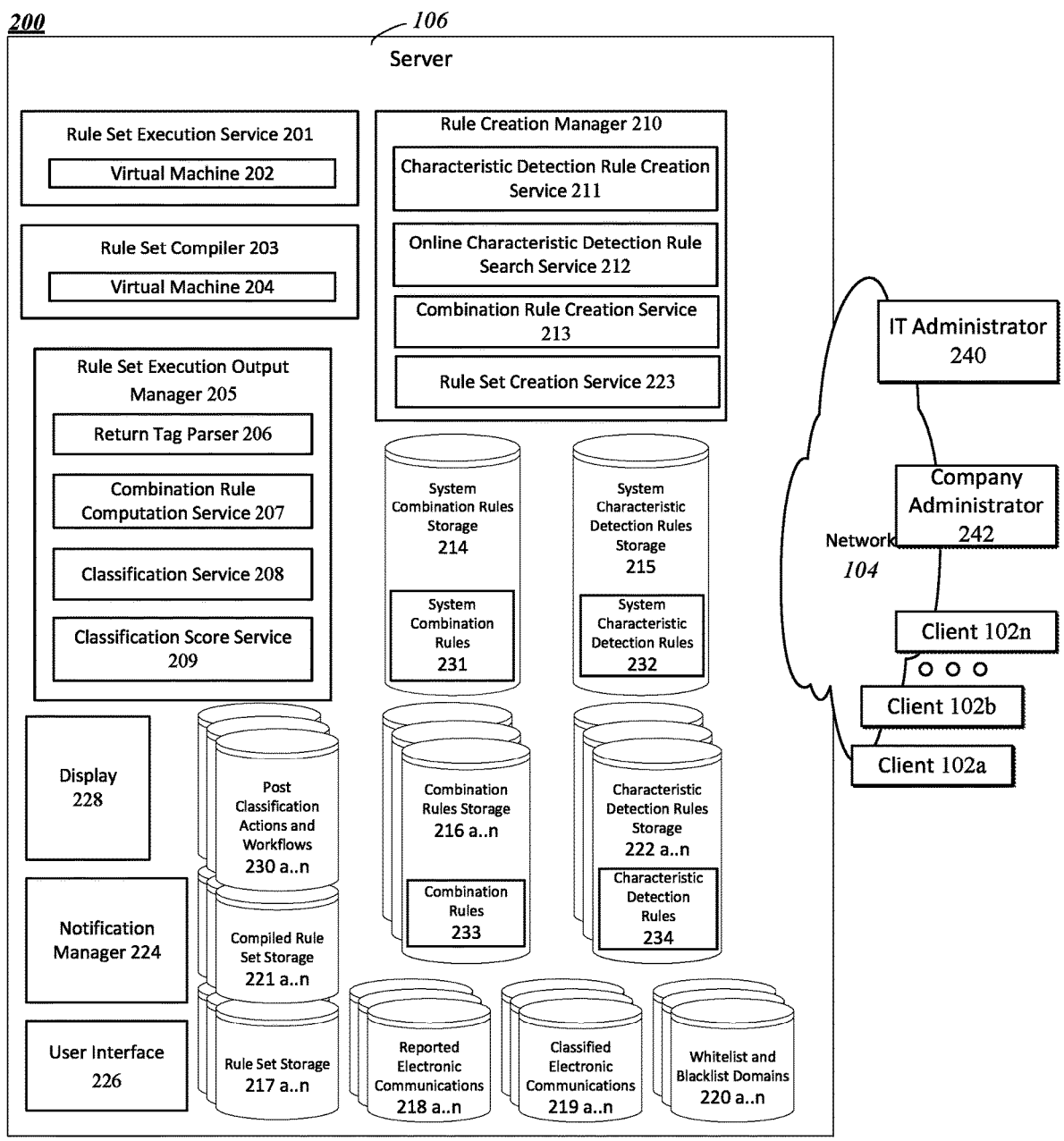
FIG. 2A depicts an implementation of some of the server architecture of an implementation of a system capable of efficiently combining characteristic detection rules.

Referring to FIG. 2A in a general overview, FIG. 2A depicts some of the server architecture of an implementation of a system 200 capable of efficiently combining characteristic detection rules, such as may be done to efficiently and quickly assist in the dispositioning of user reported security threats. In some implementations, system 200 includes server 106, one or more clients 102a . . . n, and network 104 allowing communication between these system components. Server 106 may include rule set execution service 201. Rule set execution service 201 may include virtual machine 202. Server 106 may include rule set compiler 203. Rule set compiler 203 may include virtual machine 204. Server 106 may include rule set execution output manager 205. Rule set execution output manager 205 may include return tag parser 206, combination rule computation service 207, classification service 208, and classification score service 209. Server 106 may include rule creation manager 210. Rule creation manager 210 may include characteristic detection rule creation service 211, online characteristic detection rule search service 212, combination rule creation service 213, and rule set creation service 223. Server 106 may also include notification manager 224, user interface 226, and display 228. Server 106 may include multiple storages, for example system combination rules storage 214 containing system combination rules 231, system characteristic detection rules storage 215 containing system characteristic detection rules 232, one or more combination rules storages 216a . . . n containing combination rules 233, one or more rule set storages 217a . . . n, one or more reported electronic communications storages 218a . . . n, one or more classified electronic communications 219a . . . n, one or more whitelist and blacklist domains 220a . . . n, one or more compiled rule set storages 221a . . . n, one or more characteristic detection rules storages 222a . . . n containing characteristic detection rules 234, and post classification actions and workflows 230a . . . n. Server 106 and client 102 may interact with IT administrator 240 and company administrator 242 over network 104.

Referring again to FIG. 2A in more detail, rule set execution service 201 including optional virtual machine 202 manages the execution of a compiled rule set against one or more reported electronic communications 218. One or more clients 102 may find one or more electronic communications to be suspicious and may report the one or more electronic communications as such. Reported electronic communications may be stored in reported electronic communications storage 218. In some examples, user reported electronic communications are stored in reported electronic communications storage 218 only if the reported message was not an electronic communication that was sent as part of a simulated phishing attack, such as a simulated phishing message.

Rule set execution service 201 may communicate with compiled rule set storage 221 to retrieve compiled rule sets for execution. Rule set execution service 201 may communicate the output of the execution of a compiled rule set to rule set execution output manager 205 for further processing. In some embodiments, rule set execution service 201 may communicate with rule set compiler 203 and may receive a compiled rule set from rule set compiler 203 for execution. Rule set execution service 201 may include a memory configurable to load the executable file into for execution.

In some examples, rule set compiler 203 compiles one or more rules into a compiled rule set which may be executed by rule set execution service 201. Rule set compiler may comprise virtual machine 204. Output of rule set compiler 203 may be an executable machine code file, a non-executable machine code object file, or a serialized representation of multiple characteristic detection rules which can be loaded into the YARA runtime. Rule set compiler 203 may additionally include additional metadata in the executable file, for example specify an entry point which specifies the virtual memory address at which the rule set execution service 201 may start execution of the compiled rule set. Rule set compiler 203 may store compiled rule sets in one or more compile rule set storages 221a . . . n. Rule set compiler 203 may in addition or instead send compiled rule sets to rule set execution service 201. Rule set compiler 203 may interface with system combination rules storage 214 and combination rules storage 216. Rule set compiler 203 may interface with rule set storage 217 to retrieve one or more rule sets to compile into one or more compiled rule sets.

Server 106 may include rule set execution output manager 205. Rule set execution output manager 205 may interface with rule set execution service 201 and may receive the output of the execution of one or more compiled rule sets from rule set execution service 201. Rule set execution output manager may include return tag parser 206, which is configurable to receive tags that are returned from rule set execution service 201, the tags in some embodiments corresponding the characteristic detection rules that have matched an electronic communication. Return tag parser 206 may interface with combination rule computation service 207. Combination rule computation service 207 may interface with system combination rules storage 214 and combination rules storage 216, for example to retrieve one or more logical expressions corresponding to one or more combination rules. Combination rule computation service 207 may be configured to evaluate one or more logical expressions corresponding to one or more combination rules that comprise an the output of the evaluation of one or more rule sets. Combination rule computational service 207 may output the binary result (e.g., yes it matches, or not it doesn't match) of the evaluation of a combination rule to classification service 208.

Classification service 208 may interface with classification score service 209, for example in embodiments where an electronic communication is assigned a severity score. In some example, classification service 208 applies a classification to one or more reported electronic communications 218 based on the output from combination rule computational service 207. Classification service 208 may interface with classified electronic communications storage 219, for example to store classification and/or classification scores for electronic communications. Classification service 208 may interface with reported electronic communications 218, for example to remove electronic communications from this storage that have been classified. Classification service 208 may interface with notification manager 224, for example to trigger a notification related to the classification of an electronic communication.

Classification score service 209 may apply a score to an electronic communication based upon one or more outputs of classification service 208. In some examples, if multiple compiled rule sets are executed for a single electronic communication, classification score service 209 may apply varying severity scores to the electronic communication depending on the number of compiled rule sets which resulted in a match, or depending on which of the one or more of the combination rules matched against the electronic communication. In some examples, compiled rule sets may be executed against different parts of an electronic communication. For example, one compiled rule set may be executed against the header of an electronic communication, one compiled rule set may be executed against the body of the electronic communication, one compiled rule set may be executed against the metadata of the electronic communication, one compiled rule set may be executed against the attachment of the electronic communication, and so on. In this example, classification score service 209 may assign a higher severity score to an electronic communication that produces a match against more than one of the compiled rule sets executed against that communication, as compared to an electronic communication that produced a match against only one of the compiled rule sets executed against that communication. In examples, classification score service 209 may assign a higher severity score to an electronic communication that produces a match against one part of an electronic communication, as compared to a different part of an electronic communication.

Server 106 may include rule creation manager 210. Rule creation manager 210 may interface with user interface 226 and display 228, providing an interface for a system administrator to create and manipulate rules, such as any of the rules described herein. IT administrator 240 and company administrator 242 may interface with rule creation manager 210 over network 104, providing an interface for an IT administrator 240 and/or company administrator 242 to create and manipulate rules that are specific to an organization. Rule creation manager 210 may contain characteristic detection rule creation service 211. Characteristic detection rule creation service is configured to create characteristic detection rules, which may be created by a system administrator and stored in system characteristic detection rules storage 215. Characteristic detection rule creation service 210 is configured to receive input from IT administrator 240 and/or company administrator 242 and may create characteristic detection rules that are associated with a specific organization and may store organization specific characteristic detection rules in characteristic detection rules storage 222a . . . n. Characteristic detection rule creation service 211 may interface with whitelist and blacklist domains storage 220 for the company and may use this information in the creation of characteristic detection rules.

Rule creation manager 210 may include online characteristic detection rule search service 212. A system administrator and/or IT administrator 240 via network 104 and/or company administrator 242 via network 104 may utilize online characteristic detection rule search service 212 to search online for characteristic detection rules, for example new characteristic detection rules that may be published by an online service when new threats are identified. Online characteristic detection rules search service 212 may search for characteristic detection rules e.g. via GitHub (Microsoft Corporation, San Francisco, Calif.), Carbon Black (Waltham, Mass.), Cylance (Blackberry Limited, Irvine, Calif.), Microsoft Windows Defender (Microsoft, Redmond, Calif.), CrowdStrike Sunnyvale, Calif.), Palo Alto Network Traps (Palo Alto Networks, Santa Clara, Calif.), Symantec Endpoint Detection (Symantec, Mountain View, Calif.), SentinelOne (Mountain View, Calif.), McAfee Complete Endpoint Protection (McAfee, Santa Clara, Calif.), and so on. Online characteristic detection rules search service 212 may store characteristic detection rules identified from a search by system administrator, in system characteristic detection rules 215 and may store characteristic detection rules identified from a search by IT administrator 240 or company administrator 242, in characteristic detection rules storage 222 for the company.

Rule creation manager 210 may contain combination rule creation service 213, which may interface with user interface 226 and display 228, such that a system administrator may create combination rules that may be stored in system combination rules storage 214. Combination rule creation service 213 may interface with IT administrator 240 and company administrator 242 such that a company can create company specific combination rules that may be stored in a combination rules storage 216 for the company. System administrator, IT administrator 240 and/or company administrator 242 may utilize stored system characteristic detection rules 215 and/or stored company characteristic detection rules 222 and create one or more boolean expressions that combine the binary outputs of these rules into combination rules.

Rule creation manager 210 may contain combination rule creation service 213, which may interface with IT administrator 240 and company administrator 242 such that a company can create company specific rules sets that may be stored in a rule set storage 217 for the company. System administrator, IT administrator 240 and/or company administrator 242 may utilize stored system combination rules 214 and/or stored company combination rules 216 to create rule sets and/or combination rules.

Server 106 may include one or more storages for post classification actions and workflows 230 (for example, server 106 may include one post classification actions and workflows storage 230n for each company). Notification manager 224 may interface with post classification actions and workflows storage 230 upon receiving notification of a classified electronic communication from classification service 208 and/or classification score service 209, and/or through interfacing with classified electronic communications storage 219, and may determine a notification to provide to a system administrator, and IT administrator 240, and/or a company administrator 242 based on a reported electronic communication being classified. In some examples, such a notification may be displayed on display 228.

Rule set execution output manager 205 may manage various aspects of a processing reported electronic communications. For example, rule set execution output manager 205 may process input from server 106 and/or may provide access as needed to various applications, modules, and other software components of server 106 to other various applications, modules, and other software components of server 106. Rule set execution output manager 205 may monitor and control timing of various aspects of a reported electronic communications classification, may process requests for access to reported electronic communications classification results, and/or may perform other tasks related to the analysis and classification of reported electronic communications. In some embodiments, rule set execution output manager 205 may be integrated with or coupled to memory 122. In some embodiments, memory 122 may include any type and form of storage, such as a database or file system. Memory 122 may store data such as parameters and scripts corresponding to the choices made by server 106 through rule set execution output manager 205, e.g. as described above for a particular reported electronic communication. Rule set execution output manager 205 may be an application, service, daemon, routine, or other executable logic for analyzing and classifying reported electronic communications.

In an implementation, rule set execution output manager 205 may be e.g., another name for a system administrator, such as a security manager, a third-party security consultant, a risk assessor, or any other party that uses rule set execution output manager 205 installed on a server. Server 106 may wish to analyze and classify electronic communications reported by users of an organization. Rule set execution output manager 205 may be, for example, a desktop computer, a laptop computer, a mobile device, or any other suitable computing device. Rule set execution output manager 205 may be e.g., an application on a device that allows a user of the device to interact with server 106 for e.g. purposes of using rule creation manager 210 to search and/or create characteristic detection rules, combination rules, and/or rule sets, for using rule set execution service 201 to execute one or more compiled rule sets against one or more reported electronic communications, and for using rule set execution output manager 205 for analyzing and/or classifying user reported electronic communications.

In an implementation, rule set execution output manager 205 and/or rule set execution service 201 and/or rule creation manager 210, when executed, causes a graphical user interface to be displayed, for example to accept user input. In other embodiments rule set execution output manager 205 and/or rule set execution service 201 and/or rule creation manager 210 allows for user input through a non-graphical user interface, such as a user interface that accepts text or vocal input without displaying an interactive image. A graphical user interface may be displayed on a screen of a mobile phone, or a monitor connected to a desktop or laptop computer or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. Google Chrome (Google, Mountain View, Calif.), Microsoft Internet Explorer (Microsoft, Redmond, Wash.), or Mozilla Firefox (Mozilla Foundation of Mountain View, Calif.), or may be an application installed on a user device capable of opening a network connection to rule set execution output manager 205 and/or rule set execution service 201 and/or rule creation manager 210, or may be any other type of interface.

In an implementation rule set execution output manager 205 and/or rule set execution service 201 and/or rule creation manager 210 and/or server 106 may make choices concerning how analysis and/or classification of reported electronic communications is carried out. For example, a graphical user interface run by rule set execution output manager 205 and/or rule set execution service 201 and/or rule creation manager 210 may be displayed to server 106. An administrator, via server 106, may input parameters for the analysis and/or classification of reported electronic communications that affect how the analysis will be carried out. For example, via server 106 an administrator may make choices as to which reported electronic communications from which reporting users to analyze and/or classify, or the order in which reported electronic communications are analyzed and/or classified, or the timing of various aspects of analyzing and/or classifying reported electronic communications, and other choices. These choices may be made by selecting options displayed on a graphical user interface from dropdown menus, being presented with choices through a wizard, or in any other manner.

In an implementation, rule set execution output manager 205 and/or rule set execution service 201 and/or rule creation manager 210 may allow server 106, such as via application programming interfaces (APIs), to access and/or change settings of an account maintained with any party involved with the cybersecurity response, such as, for example, a third party security service provider, or may allow server 106 to access and/or change settings of an account maintained with a third party security service provider such as one that e.g. manages an database of characteristic detection rules, cybersecurity attack sources and/or types, etc., to view bills and/or make payments to a third party security service provider, to perform functions with other third parties involved in the analysis and/or classification of reported electronic communications, or provide any other functions that would be appropriate for facilitating the analysis and/or classification of reported electronic communications by server 106 and any other parties involved in the analysis and/or classification of reported electronic communications.

Rule set execution output manager 205 and/or rule set execution service 201 and/or rule creation manager 210 may be an application, service, daemon, routine, or other executable logic. Rule set execution output manager 205 and/or rule set execution service 201 and/or rule creation manager 210 may be integrated with or coupled to memory or a memory store or otherwise a storage, such as a database.

Each of server 106, rule set execution service 201, rule set compiler 203, rule set execution output manager 205, tag parser 206, combination rule computation service 207, classification service 208, classification score service 209, rule creation manager 210, characteristic detection rule creation service 211, online characteristic detection rule search service 212, combination rule creation service 213, and rule set creation service 223 may comprise a program, service, task, script, library, application or any type and form of executable instructions or code executable on one or more processors.

Each of server 106, rule set execution service 201, rule set compiler 203, rule set execution output manager 205, tag parser 206, combination rule computation service 207, classification service 208, classification score service 209, rule creation manager 210, characteristic detection rule creation service 211, online characteristic detection rule search service 212, combination rule creation service 213, and rule set creation service 223 may be combined into one or more modules, applications, programs, services, tasks, scripts, libraries, applications, or executable code.

Server 106 may be a part of a cluster of servers 106. In some embodiments, tasks performed by server 106 may be performed by a plurality of servers. These tasks may be allocated among the plurality of servers by an application, service, daemon, routine, or other executable logic for task allocation. The server 106 may include a processor and memory. Some or all of server 106 may be hosted on cloud 108, for example by Amazon Web Services (AWS).

Figure 2B:
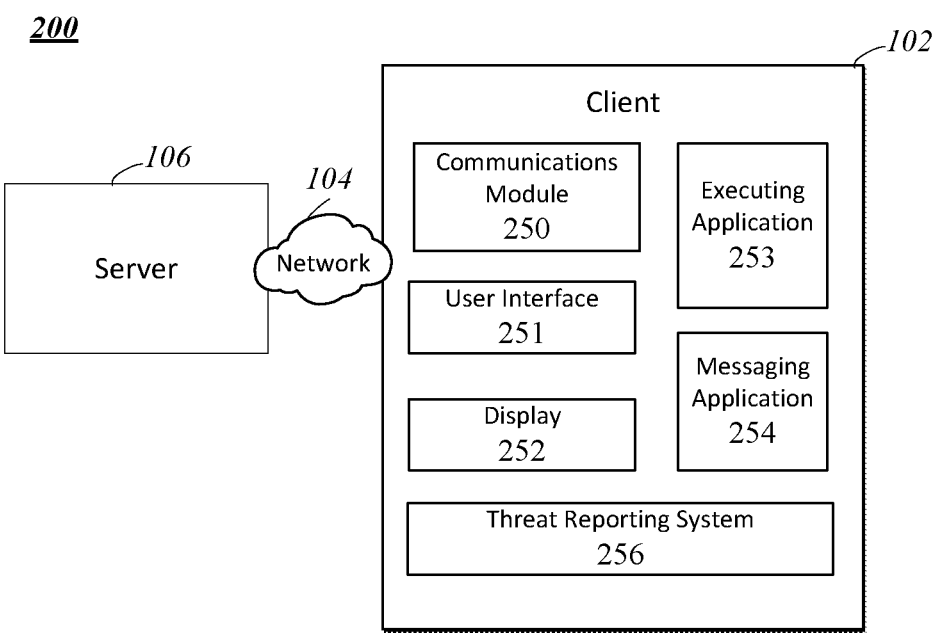
FIG. 2B depicts an implementation of some of the client architecture of an implementation of a system capable of efficient combining characteristic detection rules.

Referring to FIG. 2B, in a general overview, FIG. 2B depicts some of the client architecture of an implementation of a system 200 capable of efficiently combining characteristic detection rules, such as may be done to efficiently and quickly assist in the dispositioning of user reported security threats. The system 200 also includes client 102. Client 102 may include communications module 250, user interface 251, display 252, executing application 253, messaging application 254, and threat reporting system 256.

Referring to FIG. 2B, in more detail, client 102 may report an electronic communication as being a suspected cybersecurity attack. For example, client 102 may be an employee, member, or independent contractor for an organization. Client 102 may be any device used by the client, such as client device 102. The client does not need to own the device for it to be considered a client device 102. The client 102 may be any computing device, such as a desktop computer, a laptop, a mobile device, or any other computing device. In some embodiments, client 102 may be a server or set of servers accessed by the client. Client 102 may access a server that is e.g. owned or managed or otherwise associated with the organization. Such a server may be a client 102.

In some implementations, client 102 may include communications module 250. This may be a library, application programming interface (API), a set of scripts, or any other code that may facilitate communications between client 102 and any of server 106, a third-party server, or any other server. In some embodiments, communications module 250 determines when to transmit information from client 102 to external servers via network 104. In some embodiments, communications module 250 receives information from server 106 via network 104. In some embodiments, the information transmitted or received by communications module 250 may correspond to reported electronic communications, such as an electronic mail or email, generated or received by messaging application 254.

In some embodiments, client 102 may include user interface 251 such as a keyboard, a mouse, a touch screen, or other appropriate user interface. This may be a user interface that is e.g. connected directly to client 102, such as, for example, a keyboard connected to a mobile device, or may be connected indirectly to client 102, such as, for example, a user interface of a client device used to access a server client 102. The client may include display 252, such as a screen, a monitor connected to the device in any manner, or any other display.

In an implementation, client 102 may include messaging application 254. Messaging application 254 may be any application capable of viewing, editing, and/or sending messages. For example, messaging application 254 may be an instance of an application that allows viewing of a desired message type, such as any web browser, a Gmail™ application (Google, Mountain View, Calif.), Microsoft Outlook™ (Microsoft, Mountain View, Calif.), WhatsApp™ (Facebook, Menlo Park, Calif.), a text messaging application, or any other appropriate application. In some embodiments, messaging application 254 can be configured to display received electronic communications.

In some examples, client 102 may receive electronic communications via messaging application 254, display electronic communications for the user using display 252, and accept user interaction via user interface 251 responsive to displayed electronic communications. In some embodiments, if the user interacts with an electronic communication that comprises a cybersecurity attack, server 106 may encrypt files on the client device.

In some embodiments, client 102 may include threat reporting system 256. Threat reporting system 256 may be configured to enable users to report to server 106 that an electronic communication that has been received is suspected to be a security threat. In some examples, threat reporting system 256 may comprise a plug in to an email client. In embodiments, a user may trigger the reporting of suspected electronic communications by interacting with a user interface on client 102. In embodiments, a user may trigger the reporting of suspected electronic communications by clicking on a button on a user interface associated with a messaging application 254 on client 102. In embodiments, in response to receiving an interaction by a user with user interface 251 on client 102, client 102 will forward the received electronic communication to server 106 for analysis and classification. In embodiments, client 102 may remove a reported electronic communication from a user's inbox in messaging application 254, for example by moving the electronic communication to a junk folder or to a trash folder.

Each of client 102, user interface 251, communications module 250, messaging application 154, executing application 253, and threat reporting system 256 may comprise a program, service, task, script, library, application or any type and form of executable instructions or code executable on one or more processors. Any of client 102, user interface 251, communications module 250, messaging application 154, executing application 253 and threat reporting system 256 may be combined into one or more modules, applications, programs, services, tasks, scripts, libraries, applications, or executable code.

Referring to FIG. 3 in a general overview, FIG. 3 depicts an implementation of a method 300 for efficiently combining characteristic detection rules, such as may be done to efficiently and quickly assist in the dispositioning of user reported security threats. In step 310, method 300 may include identifying a combination rule comprising a plurality of characteristic detection rules, to be applied against an electronic communication to detect characteristics. In step 320, method 300 may include generating an identifier each characteristic detection rule. In step 330, method 300 may include compiling the plurality of characteristic detection rules and their identifiers into a compiled rule set. In step 340, method 300 may include executing the compiled rule set against the electronic communication to detect whether the electronic communication comprises a characteristic corresponding to the compiled rule set. In step 350, method 300 may include receiving the identifier for each characteristic detection rule that matched against the electronic communication. In step 360, method 300 may include determining whether the combination rule matches the electronic communication by applying logical operators of the combination rule based on the result of each characteristic detection rule.

Referring to FIG. 3 in more detail, method 300 may include identifying a combination rule comprising a plurality of characteristic detection rules, to be applied against an electronic communication to detect characteristics (step 310). A combination rule may be selected from system combination rules, e.g., from system combination rules storage 214, which are created and provided by the system administrator of the threat detection and classification system. In some examples, combination rules may be selected from combination rules storage 216 which is associated with a company, the combination rules in combination rules storage 216 associated with the company created by IT administrator 240 and/or company administrator 242 utilizing rule creation manager 210. In some embodiments, a combination rule comprising a plurality of characteristic detection rules to be applied against electronic communications is part of a rule set for the company, the rule set to be applied against part or all or all reported electronic communications.

In some embodiments, the combination rule may comprise a plurality of characteristic detection rules combined via one or more logical operators, the characteristic detection rules identified by a combination rule identifier and an index and comprising a description of a specified characteristic based on one of a textual or a binary pattern.

In implementations, characteristic detection rules 234 may comprise a rule, logic, or code that is configurable to detect a characteristic of at least a portion of an electronic communication. Although at times the characteristic detection rules may be described generally implemented as a YARA rule, the characteristic detection rules may comprise any type and form of rule configured to perform the functionality and operations described herein. In some embodiments, one or more of the plurality of characteristic detection rules 234 comprises a YARA rule. For example, YARA is a tool aimed at helping security researchers to identify and classify malware samples. YARA rules allow the creation of descriptions of malware families based on textual or binary patterns. Each description, also known as a rule, consists of a set of strings and a Boolean expression which determines its logic. An example of a YARA rule is as follows:

```
rule silent_banker : banker
{
    meta:
        description = "This is just an example"
        thread_level = 3
        in_the_wild = true
    strings:
        $a = {6A 40 68 00 30 00 00 6A 14 8D 91}
        $b = {8D 4D B0 2B C1 83 C0 27 99 6A 4E 59 F7 F9}
        $c = "UVODFRYSIHLNWPEJXQZAKCBGMT"
    condition:
        $a or $b or $c
}
```

This rule indicates that any object containing one of the three strings must be reported as "silent_banker". In other words, when the conditions in a YARA rule match, the identifier, or tag, of the YARA rule is returned.

Method 300 may include generating an identifier for each characteristic detection rule (step 320). In some embodiments, the identifier of each characteristic detection rule comprises a predetermined identifier corresponding to characteristic detection rules. An example identifier or tag that would be added to a characteristic detection rule prior to compilation is as follows:

PHISHER_f5b5b90b52fd4d53ba8236454639f7c5_1

The predetermined identifier (PHISHER) is recognized by threat dispositioning system as an indication that the characteristic detection rule is part of the threat dispositioning system. The rule identifier in the identifier or tag (f5b5b90b52fd4d53ba8236454639f7c5) indicates the combination rule that this characteristic detection rule belongs to. The index ("1") in the identifier or tag identifies a position of the characteristic detection rule in the combination rule that it is associated with. The index could be any identifier which uniquely determines the combination rule that the characteristic detection rule belongs to. In some examples, the index is a non-negative integer. In other examples, the index is an alphanumeric string. The index may be a globally unique identifier, and the index may be used to determine both the combination rule and the part of the Boolean expression in that combination rule that this characteristic detection rule belongs to. In examples, the index is unique only to the combination rule, and the rule identifier of the combination rule together with the index determines the combination rule and the part of the Boolean expression of that combination rule that matched. In examples, the matching information to connect a characteristic detection rule to a combination rule may be added as a suffix on the rule name, for example originalRuleName_[ruleID]_[conditionIndex]). Anything unique can be added to the identifier or tag of the characteristic detection rule such that what is returned if the rule is matched (rule name, tags, metadata, etc.) can be used to identify the combination rule and the position in the Boolean expression of the combination rule.

In examples, the identifier or tag has three parts separated by underscores (_). In other examples, the three parts of the identifier or tag are separated by a character that is identifiable by the system as a separation character. In some embodiments, the identifier or tag of the characteristic detection rule comprises metadata associated with the characteristic detection rule. The parts of the characteristic detection rule identifier or tag may be organized in any order. In some examples, the characteristic detection rule identifier or tag begins with a predetermined identifier, followed by a rule identifier, followed by an index, each separated by a separation character.

In some embodiments, the combination rule is configured with the plurality of characteristic detection rules to detect characteristics in a predetermined portion of the electronic communication. In some examples, a first one or more of the plurality of characteristic detection rules of the combination rule is configured to detect characteristics in a first predetermined portion of the electronic communication and a second one or more of the plurality of characteristic detection rules of the combination rule is configured to detect characteristics in a second predetermined portion of the electronic communication.

Other examples of a YARA rule as a characteristic detection rule are as follows:

```
        // Basic PhishER rule that matches if its YARA
condition matches.
        "id": "7c36652b-adf3-4bec-a160-cb935d503de1",
        "condition": {
            "yara_operation": {
                "target": "RAW_EMAIL",
                // Tag that PhishER would add:
PHISHER_7c36652badf34beca160cb935d503del_0
                "rule": "rule eicar\n{\n\tmeta:\n\t\tdescription =
\"Rule to detect Eicar pattern\"\n\n\tstrings:\n\t\t$s1 =
\"X5O!P%@AP[4\\\\PZX54(P^)7CC)7}$EICAR-STANDARD-
ANTIVIRUS-TEST-FILE!$H+H*\" fullword ascii\n\n\tcondition:
\n\t\tall ofthem\n}"
            }
        }
    },
```

The ID of the combination rule is 7c36652b-adf3-4bec-a160-cb935d503de1, which may be written without the hyphens, as 7c36652badf34beca160cb935d503de1. The target of the characteristic detection rule is the raw email, which is indicated by "target": "RAW_EMAIL". The identifier or tag that the system would add to a characteristic detection rule that is part of the combination rule is PHISHER_7c36652badf34beca160cb935d503de1_0, and the index of this characteristic detection rule is 0. The characteristic detection rule is looking for:

```
    "rule": "rule eicar\n{\n\tmeta:\n\t\tdescription = \"Rule
    to detect Eicar pattern\"\n\n\tstrings:\n\t\t$s1 =
    \"X5O!P%@AP[4\\\\PZX54(P^)7CC)7}$EICAR-STANDARD-
    ANTIVIRUS-TEST-FILE!$H+H*\" fullword
    ascii\n\n\tcondition:\n\t\tall of them\n}"
```

This is an example embodiment of the rule itself. If the Eicar pattern is detected in the electronic communication, then running this characteristic detection rule against the electronic communication would return the identifier or tag: PHISHER_7c36652badf34beca160cb935d503de1_0.

Another example is as follows:

```
// PhishER NOT rule that matches if its YARA condition does
NOT match.
        "id": "36132a3f-99e9-4a17-bb2e-6d2218924cea",
```

```
        "condition": {
            "logical_operation": {
                "operator": "NOT",
                "conditions": [
                    {
                        "yara_operation": {
                            "target": "RAW_EMAIL",
                            // Tag that PhishER would add:
PHISHER_36132a3f99e94a17bb2e6d2218924cea_0
                            "rule": "rule
eicar\n{\n\tmeta:\n\t\tdescription = \"Rule to detect Eicar
pattern\"\n\n\tstrings:\n\t\t$s1 =
\"X5O!P%@AP[4\\\\PZX54(P^)7CC)7}$EICAR-STANDARD-
ANTIVIRUS-TEST-FILE!$H+H*\" fullword ascii\n\n\tcondition:
\n\t\tall ofthem\n}"
                        }
                    }
                ]
            }
        }
    }
```

The ID of the combination rule is 36132a3f-99e9-4a17-bb2e-6d2218924cea, which may be written without the hyphens, as 36132a3f99e94a17bb2e6d2218924cea. In this example, there is only one characteristic detection rule that forms this combination rule, and so the index of the characteristic detection rule, which indicates its position in the boolean expression of the combination rules, is "0", and the combination rule in its totality would be NOT (0).

The target of the characteristic detection rule is the raw email, which is indicated by "target": "RAW_EMAIL". The identifier or tag that the system would add to this characteristic detection rule is PHISHER_736132a3f99e94a17bb2e6d2218924cea_0, and the index of this characteristic detection rule is 0. The characteristic detection rule is looking for:

```
    "rule": "rule eicar\n{\n\tmeta:\n\t\tdescription = \"Rule
    to detect Eicar pattern\"\n\n\tstrings:\n\t\t$s1 =
    \"X5O!P%@AP[4\\\\PZX54(P^)7CC)7}$EICAR-STANDARD-
    ANTIVIRUS-TEST-FILE !$H+H*\" fullword
    ascii\n\n\tcondition:\n\t\tall of them\n}"
```

This is an example embodiment of the rule itself. If the Eicar pattern is detected in the raw electronic communication, then running this characteristic detection rule against the electronic communication would return the identifier or tag:
PHISHER_7c36652badf34beca160cb935d503de1_0

In other words, when the compiled characteristic detection rule is run, if this identifier or tag:
PHISHER_36132a3f99e94a17bb2e6d2218924_cea 0
is returned, then NOT(0) would be FALSE and the output of the combination rule against the electronic communication is false. If, however when the compiled YARA rule is run, this tag:
PHISHER_36132a3f99e94a17bb2e6d2218924cea_0
is NOT returned, then NOT(0) would be TRUE and the output of the combination rule against the electronic communication is true.

Another example is as follows:

```
// PhishER OR rule that matches if at least one of its
two YARA conditions match.
        "id": "f5b5b90b-52fd-4d53-ba82-36454639f7c5",
        "condition": {
```

```
            "logical_operation": {
                "operator": "OR",
                "conditions": [
                    {
                        "yara_operation": {
                            "target": "BODY",
                            // Tag that PhishER would add:
PHISHER_f5b5b90b52fd4d53ba8236454639f7c5_0
                            "rule": "rule
eicar\n{\n\tmeta:\n\t\tdescription = \"Rule to detect
Eicar pattern\"\n\n\tstrings:\n\t\t$s1 =
\"X5O!P%@AP[4\\\\PZX54(P^)7CC)7}$EICAR-STANDARD-
ANTIVIRUS-TEST-FILE!$H+H*\" fullword
ascii\n\n\tcondition:\n\t\tall of them\n}"
                        }
                    },
                    {
                        "yara_operation": {
                            "target": "ATTACHMENT",
                            // Tag that PhishER would add:
PHISHER_f5b5b90b52fd4d53ba8236454639f7c5_1
                            "rule": "rule
eicar\n{\n\tmeta:\n\t\tdescription = \"Rule to detect Eicar
pattern\"\n\n\tstrings:\n\t\t$s1 =
\"X5O!P%@AP[4\\\\PZX54(P^)7CC)7}$EICAR-STANDARD-
ANTIVIRUS-TEST-FILE!$H+H*\" fullword ascii\n\n\tcondition:
\n\t\tall ofthem\n}"
                        }
                    }
                ]
            }
        },
```

The ID of the combination rule is f5b5b90b-52fd-4d53-ba82-36454639f7c5, which may be written without the hyphens, as f5b5b90b52fd4d53ba8236454639f7c5. There are two characteristic detection rules that forms this combination rule, one with the index "0" and one with the index "1". The Boolean expression of the combination rule in its totality is:

Result=(0) OR (1)

The target of the first characteristic detection rule of the combination rule is the body of the electronic communication, which is indicated by "target": "BODY". The target of the second characteristic detection rule of the combination rule is the attachment of the electronic communication, which is indicated by "target": "ATTACHMENT". The identifier or tag that the system would add to the first characteristic detection rule is:

PHISHER_f5b5b90b52fd4d53ba8236454639f7c5_0 and the identifier or tag that the system would add to the second characteristic detection rule is:

PHISHER_f5b5b90b52fd4d53ba8236454639f7c5_1.

The first characteristic detection rule is looking in the body of the email for the pattern:

```
"rule": "rule eicar\n{\n\tmeta:\n\t\tdescription = \"Rule
to detect Eicar pattern\"\n\n\tstrings:\n\t\t$s1 =
\"X5O!P%@AP[4\\\\PZX54(P^)7CC)7}$EICAR-STANDARD-
ANTIVIRUS-TEST-FILE!$H+H*\" fullword
ascii\n\n\tcondition:\n\t\tall of them\n}"
```

The second characteristic detection rule is looking in the attachment of the electronic communication message for the pattern:

```
"rule": "rule eicar\n{\n\tmeta:\n\t\tdescription = \"Rule
to detect Eicar pattern\"\n\n\tstrings:\n\t\t$s1 =
\"X5O!P%@AP[4\\\\PZX54(P^)7CC)7}$EICAR-STANDARD-
ANTIVIRUS-TEST-FILE!$H+H*\" fullword
ascii\n\n\tcondition:\n\t\tall of them\n}"
```

If either of the identifiers or tags for the first characteristic detection rule or the second characteristic detection rule is returned, then the result of the Boolean expression of the combination rule would be TRUE.

Method 300 may include compiling the plurality of characteristic detection rules and their identifiers or tags into a compiled rule set (step 330). Before the characteristic detection rules are combined into a compiled rule set, the identifiers or tags are added. In some examples, the rule set compiled into the compiled rule set comprises one or more characteristic detection rules that apply to a specific part of the electronic communication, for example the header of an electronic communication, the body of an electronic communication, the attachment of an electronic communication, or the metadata of an electronic communication. This is more efficient as searches are only made against the part of the electronic communication where a specific textual or binary pattern is expected to be found in the case of a threat. Resources are not wasted searching for textual or binary patterns on parts of the email where they would not be found, or if found, would not be malicious.

In some embodiments, the one or more characteristic detection rules are compiled into one or more compiled rule sets by rule set compiler 203 and then stored in a compile rule set storage 221 for the company that the rules are applicable for. In some embodiments rule set compiler 203 reads rules from characteristic detection 234 in rules storage 222 for the company, and/or system characteristic detection rules storage 215, and forms a rule set and stores the rule set in rule set storage 217 for the company, prior to compiling the rule set and storing the compiled rule set in the compile rule set storage for the company 221. In examples, rule set compiler 203 combines the identifier or tag generated for each characteristic detection rule to the characteristic detection rule prior to compiling the rule set comprising the characteristic detection rule. In some examples, all the characteristic detection rules from all the combination rules for a company account are compiled together into one compiled rule set. In examples, subsets of the characteristic detection rules, for example a subset of characteristic rules that apply to a specific part of an electronic communication, are compiled into a single compiled rule set, and a different subset of characteristic detection rules that apply to a different part of an electronic communication are compiled into a different compiled rule set.

Method 300 may include executing the compiled rule set against electronic communications to detect whether the electronic communications comprise a specific characteristic corresponding to the plurality of characteristic detection rules (step 340). In some embodiments, rule set execution service 201 executes the compiled rule set against all reported electronic communications for the company. In some embodiments, rule set execution service 201 executes one compiled rule set against some reported electronic communications for the company and a different compiled rule set against other reported electronic communications for the company. In some embodiments, rule set execution service 201 executes one compiled rule set against one part of the reported electronic communications for the company (e.g., the header, the body, an attachment, metadata) and executes a different compiled rule set against a different part of the reported electronic communications for the company.

Method 300 may include receiving the identifier or tag for each characteristic detection rule matched against the electronic communication (step 350). In some examples, rule set execution service returns the identifiers or tags for each characteristic detection rule matched against an electronic communication to rule set execution output manager 205, to be parsed by return tag parser 206. In some embodiments, return tag parser 206 uses the rule identifier in the returned identifier or tag to determine which combination rule the identifier or tag is associated with. The content of the returned identifiers or tags may eliminate or reduce the need to make database calls, resulting in efficiency gains.

Method 300 may include determining, by the combination rule computation service 207, whether the combination rule matches the electronic communication by applying logical operators of the combination rule based on the result of each characteristic detection rule and the index of each characteristic detection rule (step 360). In examples, return tag parser 206 uses the index and the rule identifier in the returned tag to determine where in the Boolean expression of the combination rule to place a "1". In some embodiments, combination rule computation services places a "1" in the index position of the Boolean expression of the combination rule if a characteristic detection rule comprising the rule identifier of that combination rule and the index position in the Boolean expression is returned from the rule set execution service 201 to the rule set execution output manager 205, and the combination rule computation service 207 places "0" in the index position of the Boolean expression of the combination rule if a characteristic detection rule comprising the rule identifier of that combination rule and the index position in the Boolean expression is not returned from the rule set execution service 201 to the rule set execution output manager 205. The combination rule computation service 207 then evaluates the Boolean expression and determines the binary outcome of the combination rule (such as, either "1" or "0"). If the outcome is "0", the reported electronic communication does not match the combination rule. If the outcome is "1", the reported electronic communication does match the combination rule.

FIG. 4A depicts an illustration of an example of a characteristic detection rule. A characteristic detection rule may comprise characteristic detection rule metadata, and/or a characteristic detection rule name. In embodiments, a characteristic detection rule is a YARA rule. In some examples, a characteristic detection rule may be configured to target a specific part of an electronic communication, as indicated in a "target" field in the characteristic detection rule. In some examples, a characteristic detection rule may be configured to detect and Eicar pattern in some part or all of an electronic communication.

Figure 4B:
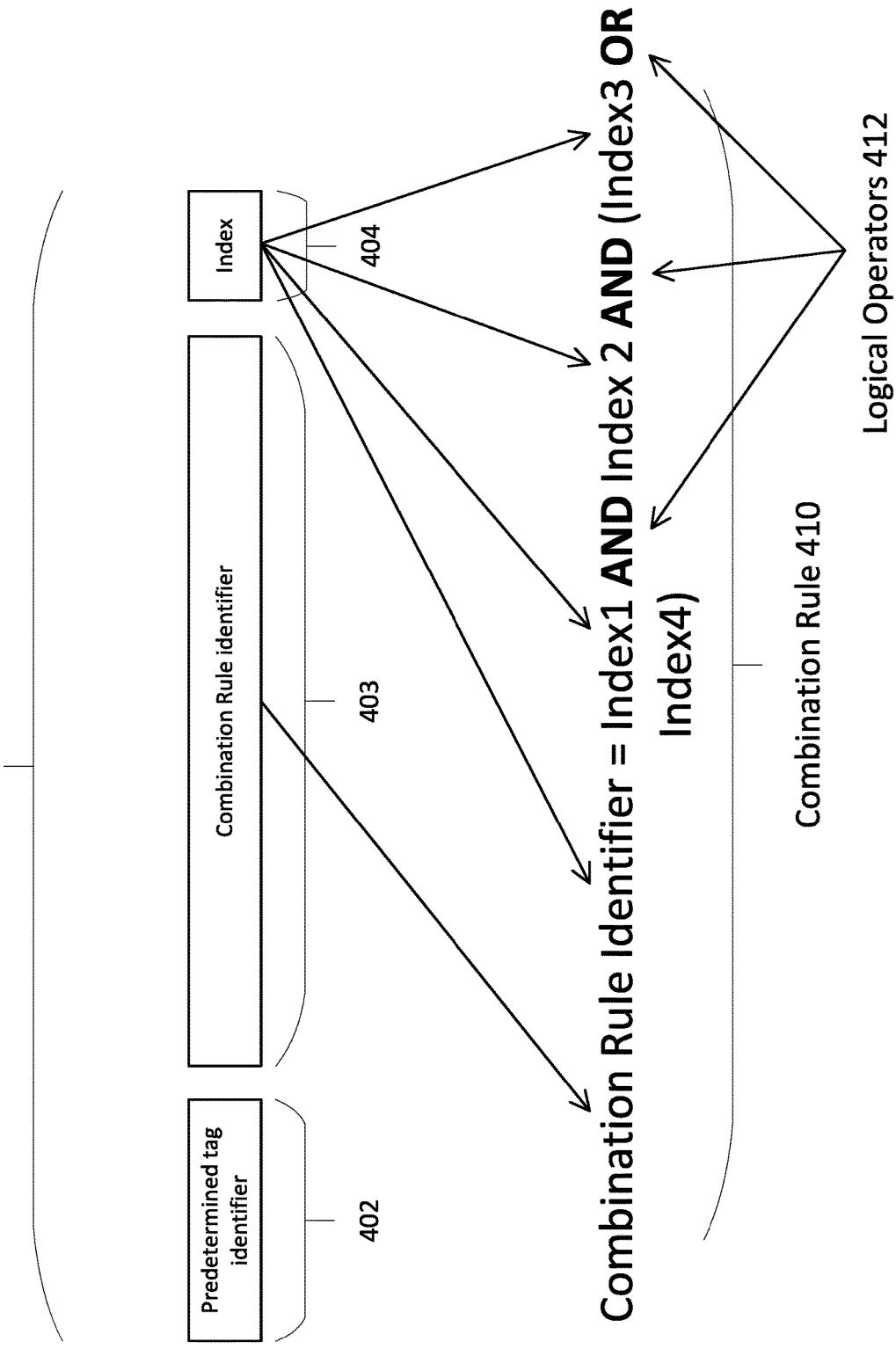
FIG. 4B depicts an illustration of a characteristic detection rule tag and a combination rule, according to some embodiments.

FIG. 4B depicts an illustration of an identifier or tag, such as an identifier or tag that is added to a characteristic detection rule, such as a characteristic detection rule tag 401. In some examples, characteristic detection rule tag 401 comprises predetermined tag identifier 402, combination rule identifier 403, and index 404. In embodiments, predetermined tag identifier 402 is at the start of characteristic detection rule tag 401, followed by combination rule identifier 403, followed by index 404, Other components may be added to characteristic detection tag 401, and predetermined tag identifier 402, combination rule identifier 403, and index 404 may be arranged in any order in characteristic detection rule tag 401. Predetermined tag identifier 402 may be combined with the index 404 and combination rule identifier 403 to form characteristic detection rule tag 401, or characteristic detection rule tag could be some combination of predetermined tag identifier 402, combination rule identifier 403 and index 404, or there could be one tag with just the combination rule identifier 403, and another tag with index 404, and so on. In general, characteristic detection rule tag 401 represents metadata added to the characteristic detection rule to indicate which combination rule, and what component of that combination rule, the characteristic detection rule is associated with.

Referring again to FIG. 4B, FIG. 4B depicts an example of combination rule 410. Combination rule 410 comprises a combination rule identifier 403 and one or more index 404a . . . n from one or more characteristic detection rule tags 401 associated with combination rule 410. Where combination rule 410 comprises more than one index 404, the indexes are combined using logical operators 412 into a Boolean expression with a binary outcome.

FIG. 4C depicts a condition of characteristic detection rule 430. In some examples, condition of characteristic detection rule 430 comprises "revision_id", which may enable tracking a characteristic detection rule over time. In some embodiments, revision_id is represented by a string, e.g., an alphanumeric string. Revision_id may be used, in some examples to identify historical versions of characteristic detection rules.

FIG. 5 depicts an illustration of rule set 510. In some examples, rule set 510 comprises one or more characteristic detection rules. Rule set 510 may comprise one or more characteristic detection rules that target a specific part of an electronic communication. For example, rule set 510 may comprise one or more characteristic detection rules that target one or more of headers of an electronic communication, the body of an electronic communication, an attachment of an electronic communication, or metadata of an electronic communication. In examples, characteristic detection rules are identified by a combination rule identifier. The association between characteristic detection rules and a combination rule is identified by including the combination rule identifier in the tag of the characteristic detection rules that comprise the combination rule expression. A combination rule may comprise a Boolean expression with a binary outcome, the Boolean expression comprised of outcomes of characteristic detection rules associated with the combination rule combined using a logical expression.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, Perl, C, C++, C #, Go, Prolog, or in any byte code language such as Java. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method for efficiently processing characteristic detection rules in a rule set, the method comprising;
  (a) identifying, by a device, a combination rule to be applied against an electronic communication to detect characteristics of the electronic communication, the combination rule comprising a plurality of characteristic detection rules combined via one or more logical operators, each of the plurality of characteristic detection rules comprising a description of a specific characteristic based on one of a textual or binary pattern;
  (b) generating, by the device, one or more identifiers for each characteristic detection rule of the plurality of characteristic detection rules to identify any characteristic detection rule of the plurality of characteristic detection rules matching the electronic communication, the identifier comprising a combination rule identifier and an index identifying a position of each characteristic detection rule within a rule set;
  (c) compiling, by the device, the rule set into a compiled rule set, the rule set comprising a plurality of characteristic detection rules with the one or more identifiers for each characteristic detection rule of the plurality of characteristic detection rules;
  (d) executing, by the device, the compiled rule set against the electronic communication to detect whether the electronic communication comprises a specific characteristic corresponding to the plurality of characteristic detection rules;
  (e) receiving, by the device from the execution of the compiled rule set, the index from each of the identifiers for each characteristic detection rule of the plurality of characteristic detection rules that matched against the electronic communication;
  (f) applying, by the device, the one or more logical operators of the combination rule based on a result of each characteristic detection rule and the index of each characteristic detection rule that matched against the electronic communication, to determine whether the combination rule matches the electronic communication;

wherein the combination rule is configured with the plurality of characteristic detection rules to detect characteristics in a predetermined portion of the electronic communication.

2. The method of claim 1, wherein one or more of the plurality of characteristic detection rules comprises a Yet Another Recursive Algorithm (YARA) rule.

3. The method of claim 1, wherein the identifier of the one or more identifiers comprises one of a predetermined pattern, a predetermined name, or the combination rule identifier with a predetermined tag identifier.

4. The method of claim 1, wherein the identifier of the one or more identifiers comprises one or more of the index with the combination rule identifier, and metadata associated with the combination rule.

5. The method of claim 1, wherein the index identifies a specific characteristic detection rule in the combination rule.

6. The method of claim 1, wherein a first one or more of the plurality of characteristic detection rules of the combination rule is configured to detect characteristics in a first predetermined portion of the electronic communication and wherein a second one or more of the plurality of characteristic detection rules of the combination rule is configured to detect characteristics in a second predetermined portion of the electronic communication.

7. The method of claim 1, wherein the electronic communication comprises electronic mail.

8. The method of claim 1, wherein more than one characteristic detection rule is combined together to form a rule set.

9. The method of claim 8, where the rule set comprises one or more characteristic detection rules that apply to one of a header of an electronic communication, a body of an electronic communication, an attachment of an electronic communication, or metadata of an electronic communication.

10. A system for more efficiently processing characteristic detection rules in a rule set, the system comprising;
  a device comprising one or more processors, coupled to memory;
  a combination rule accessible and identifiable by the device, the combination rule to be applied against an electronic communication to detect characteristics of the electronic communication, the combination rule comprising a plurality of characteristic detection rules combined via one or more logical operators, each of the characteristic detection comprising a description of a specific characteristic based on one of a textual or binary pattern;
  wherein the device is configured to:
    generate an identifier for each characteristic detection rule of the plurality of characteristic detection rules to identify any characteristic detection rule of the plurality of characteristic detection rules matching the electronic communication, the identifier comprising a combination rule identifier and a unique identifier for indexing each characteristic detection rule within each combination rule;
    compile a rule set comprising the plurality of characteristic detection rules with the identifier for each characteristic detection rule of the plurality of characteristic detection rules;
    execute the compiled rule set against the electronic communication to detect whether the electronic communication comprises a specific characteristic corresponding to the plurality of characteristic detection rules;

receive, from the execution of the compiled rule set, the unique identifier from each of the identifiers for each characteristic detection rule of the plurality of characteristic detection rules that matched against the electronic communication; and apply the one or more logical operators of the combination rule based on a result of each characteristic detection rule and the unique identifier of each characteristic detection rule that matched against the electronic communication, to determine whether the combination rule matches the electronic communication;

wherein the combination rule is configured with the plurality of characteristic detection rules to detect characteristics in a predetermined portion of the electronic communication.

11. The system of claim 10, wherein one or more of the plurality of characteristic detection rules comprises a Yet Another Recursive Algorithm (YARA) rule.

12. The system of claim 10, wherein the identifier comprises one of a predetermined pattern, a predetermined name, or the combination rule identifier with a predetermined tag identifier.

13. The system of claim 10, wherein the identifier comprises one or more of the combination rule identifier with a predetermined tag identifier, and metadata associated with the combination rule.

14. The system of claim 10, wherein the identifier comprises an index with the combination rule identifier, wherein the index identifies a location of the characteristic detection rule among the plurality of characteristic detection rules in the combination rule.

15. The system of claim 10, wherein a first one or more of the plurality of characteristic detection rules of the combination rule is configured to detect specific characteristics in a first predetermined portion of the electronic communication and wherein a second one or more of the plurality of characteristic detection rules of the combination rule is configured to detect specific characteristics in a second predetermined portion of the electronic communication.

16. The system of claim 10, wherein the electronic communication comprises electronic mail.

17. The system of claim 10, where more than one characteristic detection rule is combined together to form a rule set.

18. The system of claim 17, wherein the rule set comprises one or more characteristic detection rules that apply to one of a header of the electronic communication, a body of the electronic communication, an attachment of the electronic communication, or metadata of the electronic communication.

* * * * *